United States Patent
Ahmad et al.

(10) Patent No.: US 10,269,242 B2
(45) Date of Patent: Apr. 23, 2019

(54) AUTONOMOUS POLICE VEHICLE

(71) Applicant: Ford Global Technologies, LLC, Dearborn, MI (US)

(72) Inventors: Mohamed Ahmad, Mountain View, CA (US); Harpreetsingh Banvait, Sunnyvale, CA (US); Alexandru Mihai Gurghian, Palo Alto, CA (US); Francois Charette, Tracy, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 248 days.

(21) Appl. No.: 15/208,500

(22) Filed: Jul. 12, 2016

(65) Prior Publication Data

US 2018/0018869 A1    Jan. 18, 2018

(51) Int. Cl.
| | |
|---|---|
| *G08G 1/01* | (2006.01) |
| *G05D 1/00* | (2006.01) |
| *G05D 1/02* | (2006.01) |
| *G06K 9/00* | (2006.01) |
| *G06K 9/32* | (2006.01) |
| *G06T 7/20* | (2017.01) |
| *G08G 1/017* | (2006.01) |
| *G08G 1/054* | (2006.01) |
| *G08G 1/00* | (2006.01) |
| *B60W 30/00* | (2006.01) |

(52) U.S. Cl.
CPC ........... *G08G 1/0137* (2013.01); *B60W 30/00* (2013.01); *G05D 1/0088* (2013.01); *G05D 1/0094* (2013.01); *G05D 1/0223* (2013.01); *G05D 1/0246* (2013.01); *G06K 9/00785* (2013.01); *G06K 9/3258* (2013.01); *G06T 7/20* (2013.01); *G08G 1/0175* (2013.01); *G08G 1/054* (2013.01); *G08G 1/205* (2013.01); *G05D 2201/0212* (2013.01); *G05D 2201/0213* (2013.01); *G06K 2209/15* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,286,040 B2 | 10/2007 | Karabinis | |
| 7,701,363 B1 | 4/2010 | Zlojutro | |
| 8,009,870 B2 | 8/2011 | Simon | |
| 9,135,816 B2 | 9/2015 | Chung | |
| 9,494,439 B1 * | 11/2016 | Ross | B60W 50/029 |
| 2003/0200227 A1 | 10/2003 | Ressler | |
| 2006/0214783 A1 | 9/2006 | Ratnakar | |

(Continued)

FOREIGN PATENT DOCUMENTS

| | | |
|---|---|---|
| EP | 2954769 | 12/2015 |
| WO | WO-201522567 A1 | 2/2015 |

*Primary Examiner* — Shelley Chen
(74) *Attorney, Agent, or Firm* — David R. Stevens; Stevens Law Group

(57) ABSTRACT

Techniques pertaining to an autonomous police vehicle are described. A method may involve a processor associated with an autonomous vehicle obtaining an indication of violation of one or more traffic laws by a first vehicle. The method may also involve the processor maneuvering the autonomous vehicle to pursue the first vehicle. The method may further involve the processor remotely executing one or more actions with respect to the first vehicle.

20 Claims, 4 Drawing Sheets

(56) References Cited

U.S. PATENT DOCUMENTS

| | | | |
|---|---|---|---|
| 2010/0256835 A1* | 10/2010 | Mudalige | G08G 1/163 |
| | | | 701/2 |
| 2014/0136045 A1* | 5/2014 | Zhu | G06T 7/223 |
| | | | 701/23 |
| 2016/0129908 A1* | 5/2016 | Harda | G05D 1/0088 |
| | | | 701/24 |
| 2016/0334230 A1* | 11/2016 | Ross | G01C 21/3415 |
| 2016/0334797 A1* | 11/2016 | Ross | G08G 1/20 |
| 2016/0377508 A1* | 12/2016 | Perrone | G01M 17/06 |
| | | | 180/204 |

* cited by examiner

AUTONOMOUS POLICE VEHICLE

TECHNICAL FIELD

The present disclosure generally relates to automotive vehicles and, more particularly, to autonomous police vehicles.

BACKGROUND

The advent and continuous development of driver assistance systems enhance and automate the driving process for safety and improved user experience. One example is autonomous vehicles, which can sense the environment and surrounding areas to navigate without human input. While autonomous vehicles can and will be programmed to obey traffic laws, a human driver can override that programming to control and operate the vehicle at any time. When a vehicle is under the control of a human driver there is a possibility of violation of traffic laws. Thus, there will still be a need to police traffic.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Routine police tasks, such as issuing tickets for speeding or failure to stop at a stop sign, can be automated so that human police officers can perform tasks that cannot be automated. Accordingly, the present disclosure describes autonomous police vehicles that can, on behalf of human police officers, perform automated tasks such as enforcing traffic laws and issuing tickets/citations to drivers that violate the traffic laws.

In various embodiments in accordance with the present disclosure, an autonomous police vehicle may enforce traffic laws by identifying violators, pulling over the offending vehicle, capturing an image of license place of the offending vehicle, determining a driver of the offending vehicle, receiving an image of the driver's license (if a human is driving the vehicle), authenticating the driver's license, determining whether to issue a warning or a ticket, and communicating with the vehicle regarding the warning/ticket decision and an indication that the offending vehicle is free to leave.

Figure 1:
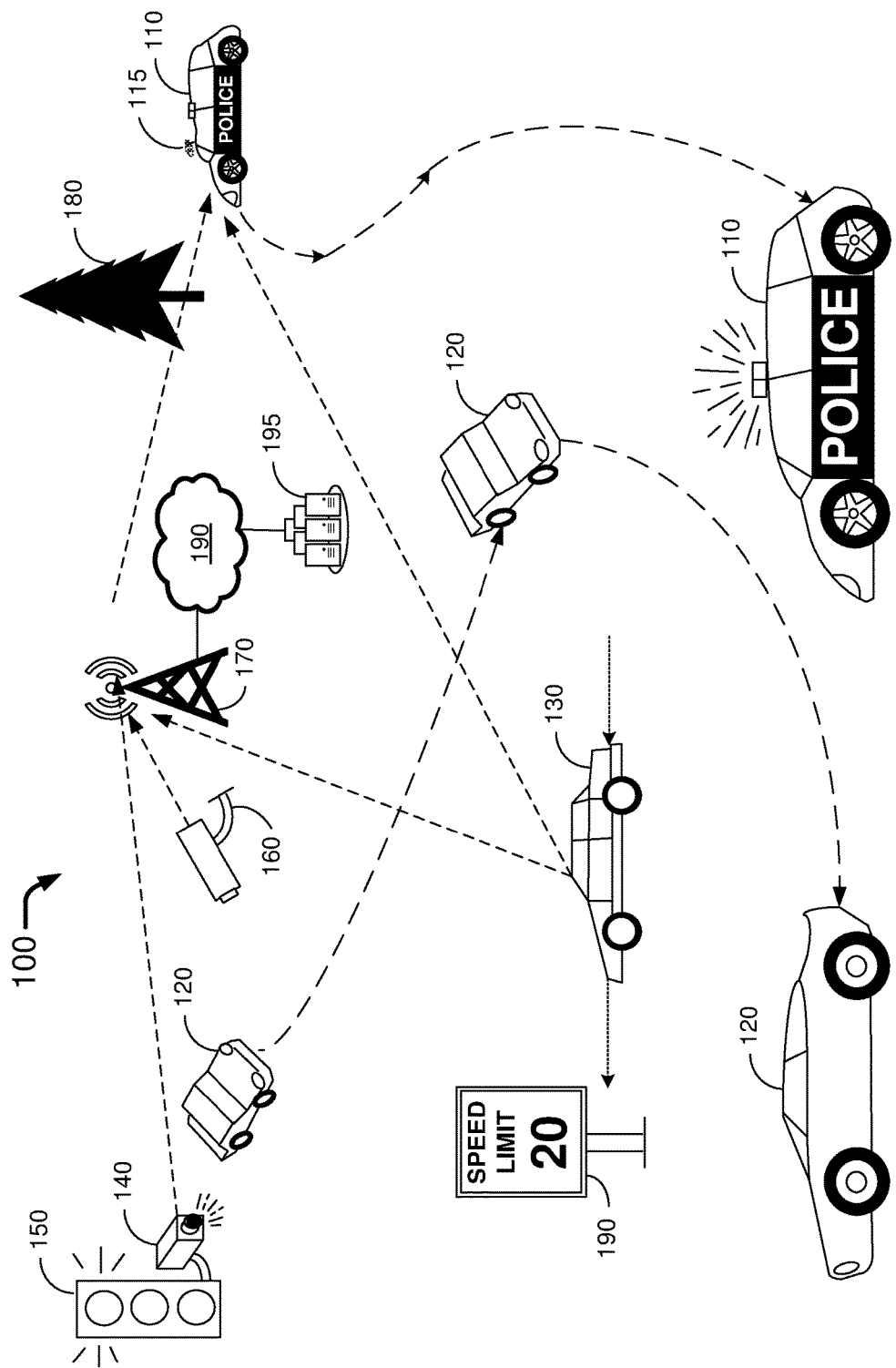
FIG. 1 is a diagram depicting an example scenario in which an autonomous police vehicle in accordance with the present disclosure may be utilized.

FIG. 1 illustrates an example scenario 100 in which an autonomous police vehicle 110 in accordance with the present disclosure may be utilized. Scenario 100 is an illustrative example of how autonomous police vehicle 110 may be used in carrying out routine police tasks in lieu of or in addition to human police officers. Autonomous police vehicle 110 may be trained or otherwise programmed using machine learning tools (e.g., deep neural networks) to find good hiding spots to catch violators of traffic laws such as, for example, speeders, red light violators and stop sign violators. Autonomous police vehicle 110 may, based on machine learning through deep neural network(s), find a spot behind an object 180 (shown as a tree in FIG. 1) and park at that spot behind object 180 so as to be inconspicuous. Autonomous police vehicle 110 may be equipped with one or more sensors (e.g., camera(s) and/or a laser system), shown as and represented by a sensor 115 in FIG. 1, to detect the speed of nearby vehicles, and autonomous police vehicle 110 may determine where to aim each of the one or more sensors to accurately monitor traffic. Autonomous police vehicle 110 may be in wireless communication with a remotely located central computing system 195 via a wireless communication infrastructure 170 and a communication network 190.

In operation, autonomous police vehicle 110 may obtain an indication of violation of one or more traffic laws by a vehicle 120. For example, autonomous police vehicle 110 may control or otherwise adjust its position and/or orientation from its current position and/or orientation so that the laser system can be aimed or pointed in a predetermined direction (e.g., towards a flow of oncoming traffic) based on a line of sight from a current location of autonomous police vehicle 110 to a spot intersecting the flow of oncoming traffic. In scenario 100, autonomous police vehicle 110 may position and/or orient itself so that the laser system aims or points toward a flow traffic including vehicle 120. As a result, autonomous police vehicle 110 may receive data (e.g., speed of vehicle 120) from the laser system. Based on the received data, autonomous police vehicle 110 may determine that a speed of vehicle 120 exceeded a threshold speed based on the received data. Autonomous police vehicle 110 may determine the threshold speed for a given section of road by searching a local traffic laws database for a legal speed limit for that section of road or by querying remote central computing system 195.

As another example, autonomous police vehicle 110 may control a sensor, which may be a camera, to point the sensor in a predetermined direction (e.g., towards a flow of oncoming traffic). In scenario 100, autonomous police vehicle 110 may control or otherwise adjust its position and/or orientation from its current position and/or orientation so that the camera can be aimed or pointed toward a flow traffic including vehicle 120, based on a line of sight from a current location of autonomous police vehicle 110 to vehicle 120. As a result, autonomous police vehicle 110 may receive one or more images from the camera. Autonomous police vehicle 110 may analyze the one or more images based on machine learning and determine that at least one of the one or more traffic laws has been violated by vehicle 120 responsive to a result of analysis of the one or more images.

Alternatively or additionally, autonomous police vehicle 110 may obtain the indication of the violation of the one or more traffic laws by vehicle 120 by wirelessly receiving a signal from a remote device, such as surveillance camera 140 and/or roadside sensor 160, or another vehicle, such as vehicle 130, with the signal indicating that at least one of the one or more traffic laws has been violated by vehicle 120. In the example shown in FIG. 1, vehicle 120 may have run by a traffic control item 150 (e.g., a stop sign or a traffic light), shown as and represented by a traffic light in FIG. 1, without stopping. There may be surveillance camera 140 associated with the traffic control item 150 as well as roadside sensor 160 (e.g., camera), each of which may detect violation of one or more traffic laws by vehicle 120 (e.g., failure to stop at a stop sign or running a red light). Each of surveillance camera 140 and roadside sensor 160 may be configured to wirelessly transmit, to central computing system 195 via wireless communication infrastructure 170 (shown as and represented by a tower in FIG. 1), a respective signal indicating that at least one of the one or more traffic laws has been violated by vehicle 120. In response to receiving such signal(s) from surveillance camera 140 and/or roadside sensor 160, central computing system 195 may transmit a signal to autonomous police vehicle 110 via wireless communication infrastructure 170 to make autonomous police vehicle 110 aware of violation of traffic law(s) by vehicle 120. Moreover, vehicle 120 may be speeding by driving at a speed higher than a speed limit 190. Vehicle 130 may be traveling in the vicinity of vehicle 120 when vehicle 120 exceeded speed limit 190. Vehicle 130 may be equipped with a speed sensor and may detect that vehicle 120 was speeding. Thus, vehicle 130 may transmit, to central computing system 195 via wireless communication infrastructure 170, a signal indicating that at least one of the one or more traffic laws has been violated by vehicle 120. In response to receiving such signal from vehicle 130, central computing system 195 may transmit a signal to autonomous police vehicle 110 via wireless communication infrastructure 170 to make autonomous police vehicle 110 aware of violation of traffic law(s) by vehicle 120.

In response to obtaining the signal or otherwise determining that at least one of the one or more traffic laws has been violated by vehicle 120, autonomous police vehicle 110 may proceed to pursue vehicle 120. In pursuing vehicle 120, autonomous police vehicle 110 may track a location of vehicle 120 and control a speed and/or a steering thereof based on a result of the tracking. For example, autonomous police vehicle 110 may be equipped with a video camera that captures a video image of vehicle 120, and autonomous police vehicle 110 may analyze a movement of vehicle 120 in the video image to track the movement and location of vehicle 120. As another example, autonomous police vehicle 110 may receive and analyze signal(s) and/or data from various remote sensors, such as surveillance camera 140 and roadside sensor 160, to determine and track the location of vehicle 120. Moreover, during the pursuit of vehicle 120, autonomous police vehicle 110 may remotely execute one or more actions with respect to vehicle 120. For example, autonomous police vehicle 110 may control a camera thereof (e.g., sensor 115) to point the camera toward a license plate of vehicle 120. Autonomous police vehicle 110 may zoom the camera to obtain an enlarged view of the license plate, and trigger the camera to capture an image of the enlarged view of the license plate. Alternatively or additionally, autonomous police vehicle 110 may receive an image of the license plate of vehicle 120 from one or more remote devices and/or one or more other vehicles (e.g., surveillance camera 140, roadside sensor 150 and/or vehicle 130).

Upon approaching vehicle 120 or pulling over vehicle 120, autonomous police vehicle 110 may remotely execute one or more actions with respect to vehicle 120. An illustrative example is described below with reference to FIG. 2.

Figure 2:
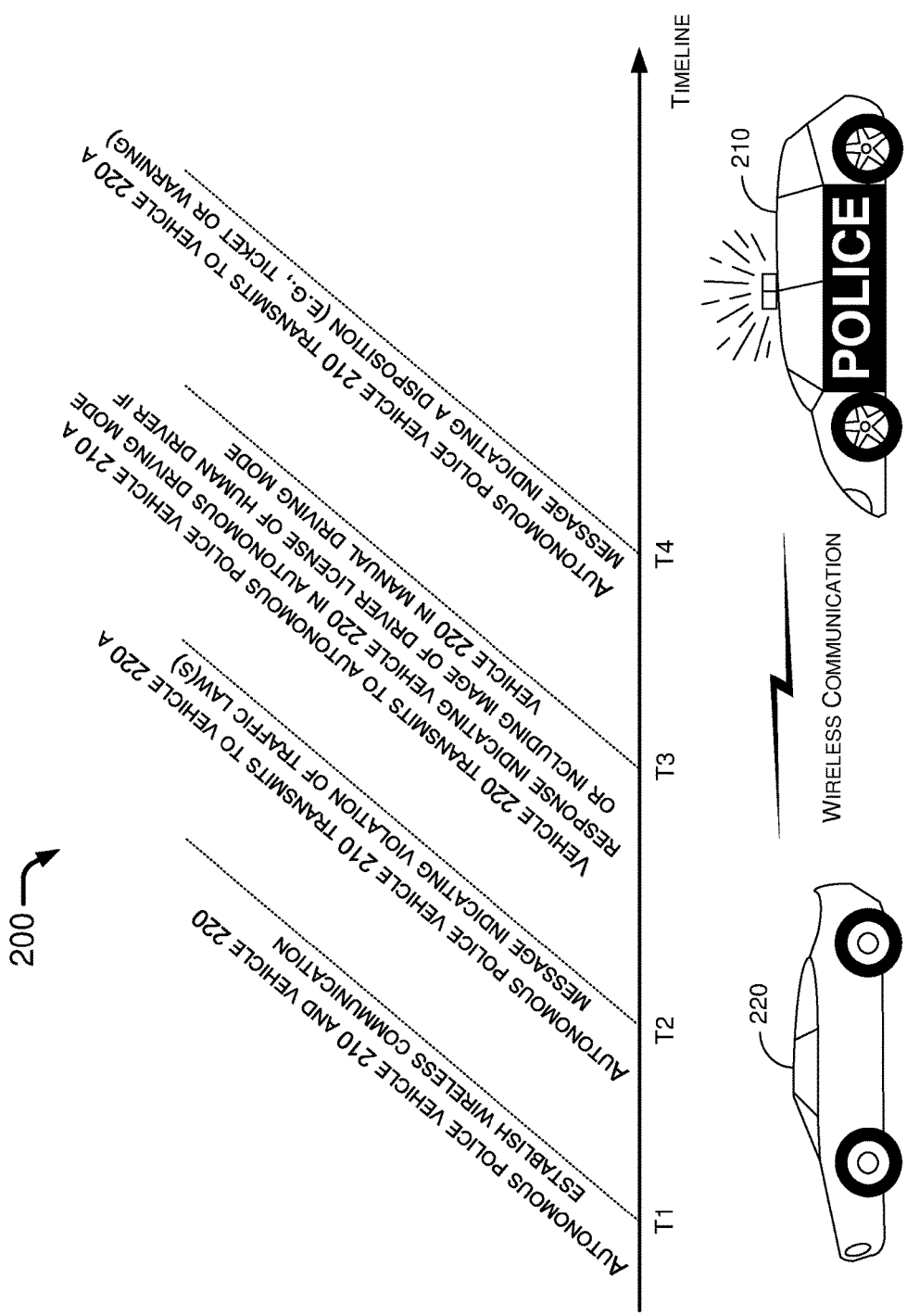
FIG. 2 is a diagram depicting another example scenario in which an autonomous police vehicle in accordance with the present disclosure may be utilized.

FIG. 2 illustrates an example scenario 200 in which an autonomous police vehicle 210 in accordance with the present disclosure may be utilized. Scenario 200 is an illustrative example of what may happen as an offending vehicle 220, having violated one or more traffic laws, has been or is being pulled over by autonomous police vehicle 210 in accordance with embodiments of the present disclosure. Each of autonomous police vehicle 210 and vehicle 220 may be an example implementation of autonomous police vehicle 110 and vehicle 120, respectively. Accordingly, description above with respect to each of autonomous police vehicle 110 and vehicle 120 applies to autonomous police vehicle 210 and vehicle 220, respectively.

As shown in scenario 200, at time T1, autonomous police vehicle 210 and vehicle 220 may first establish wireless communication using any protocol and/or technology suitable for vehicle-to-vehicle communication. After wireless communication with vehicle 220 has been established, at time T2, autonomous police vehicle 210 may wirelessly transmit a first message to vehicle 220, with the first message indicating the violation of the one or more traffic laws by vehicle 220. Vehicle 220 may be in either an autonomous driving mode (e.g., driven autonomously by a control system of vehicle 220) or a manual driving mode (e.g., driven manually by a human driver).

In an event that vehicle 220 was in the autonomous driving mode at the time of the violation of the one or more traffic laws, at time T3, vehicle 220 may wirelessly transmit a response to autonomous police vehicle 210, with the response indicating that vehicle 220 was in an autonomous driving mode at a time of the violation of the one or more traffic laws. The response may also include information identifying vehicle 220 and/or registered owner of vehicle 220. The response transmitted by vehicle 220 may be generated automatically by vehicle 220 (e.g., when vehicle 220 is in autonomous driving mode) or manually by a driver of vehicle 220 (e.g., when vehicle is in manual driving mode). Upon receiving the response from vehicle 220, autonomous police vehicle 210 may determine a disposition regarding the violation of the one or more traffic laws by vehicle 220 which was in the autonomous driving mode. Subsequently, at time T4, autonomous police vehicle 210 may wirelessly transmit a second message to vehicle 220, with the second message indicating the disposition as a result of the determination. For example, the disposition may include a ticket with a fine or a warning without a fine, and may also include a message indicating that vehicle 220 is free to leave the scene. Autonomous police vehicle 210 may keep a record of what has just transpired and/or wirelessly transmit the record to one or more government agencies (e.g., police station and/or department of motor vehicles).

In an event that vehicle 220 was in the manual driving mode at the time of the violation of the one or more traffic laws, at time T3, vehicle 220 may wirelessly transmit a response to autonomous police vehicle 210, with the response including an image of a driver's license of a human driver of vehicle 220. For example, vehicle 220 may be equipped with a camera and the driver may hold up his/her driver's license for the camera to capture the image of the driver's license to be transmitted to autonomous police vehicle 210 as part of the response. Alternatively, vehicle 220 may have an image of the driver's license of the driver stored in a local memory or database, and may transmit the image to autonomous police vehicle 210 as part of the response. Upon receiving the response from vehicle 220, autonomous police vehicle 210 may verify an authenticity of the driver's license. For example, autonomous police vehicle 210 may access a locally stored record of drivers within a given geographical region (e.g., city, county or state) and/or wirelessly requesting and receiving a record on the driver indicated in the driver's license. Responsive to a positive result of the verification of the authenticity (e.g., the driver's license is authentic), autonomous police vehicle 210 may determine a disposition regarding the violation of the one or more traffic laws by vehicle 220 which was in a manual driving mode. Subsequently, at time T4, autonomous police vehicle 210 may wirelessly transmit a second message to vehicle 220, with the second message indicating the disposition as a result of the determination. For example, the disposition may include a ticket with a fine or a warning without a fine, and may also include a message indicating that vehicle 220 is free to leave the scene. In determining whether to issue a ticket or warning, autonomous police vehicle 210 may search a local record or query a central computing system (e.g., central computing system 195) to look up any record of violation of traffic law(s) by vehicle 220 or any driver associated with vehicle 220. Autonomous police vehicle 210 may issue a ticket when there is a record of one or more prior violation of one or more traffic laws by vehicle 220 or the driver of vehicle 220. Autonomous police vehicle 210 may issue a warning when there is no record of any prior violation of traffic laws by vehicle 220 or the driver of vehicle 220. Autonomous police vehicle 210 may keep a record of what has just transpired and/or wirelessly transmit the record to one or more government agencies (e.g., police station and/or department of motor vehicles).

As autonomous police vehicle 210 may be equipped or otherwise configured to carry one or more passengers or users (e.g., police officer(s)), one or more additional manual actions may be taken by the passenger police officer(s) in scenario 200. For instance, in an event that it is determined that the driver of vehicle 220 is driving under the influence (DUI) or driving while intoxicated (DWI), the passenger police officer(s) of autonomous police vehicle 210 may take appropriate actions accordingly (e.g., stepping out of autonomous police vehicle 210, examining the driver of vehicle 220 and arresting the driver of vehicle 220). For example, autonomous police vehicle 210 may, through machine learning, recognize abnormal behavior of a vehicle as an indication of the vehicle being operated by a driver under influence. Accordingly, when the movement of vehicle 220 appears suspicious (e.g., sudden stop, meandering movement, abnormal lane changes or the like), autonomous police vehicle 210 may pull over vehicle 220 under the assumption that vehicle 220 is in manual driving mode and that the driver is under influence.

Figure 3:
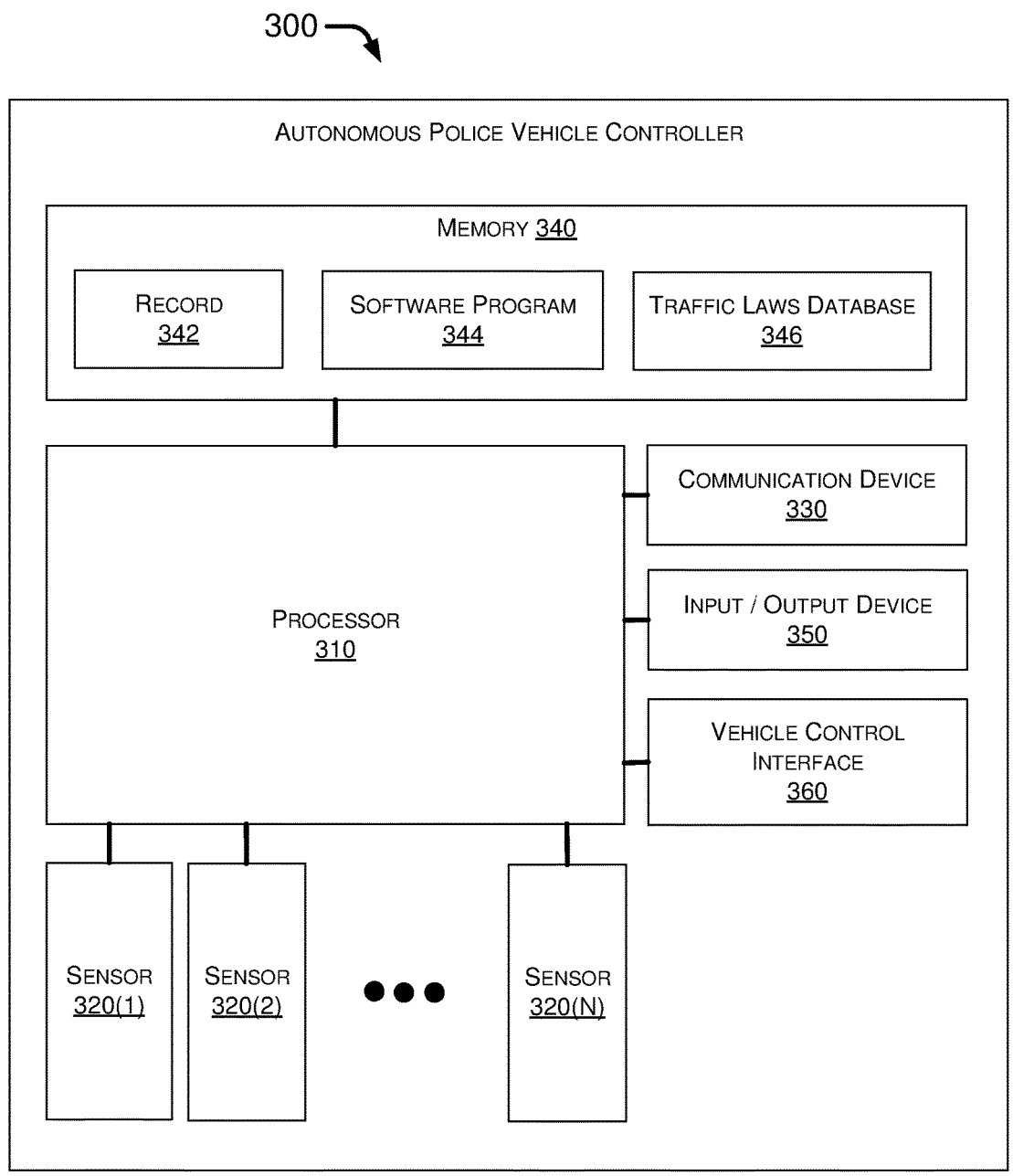
FIG. 3 is a simplified block diagram depicting an example apparatus in accordance with an embodiment of the present disclosure.

FIG. 3 illustrates an example apparatus, or autonomous police vehicle controller 300, in accordance with an embodiment of the present disclosure. Autonomous police vehicle controller 300 may perform various functions related to techniques, methods and systems described herein, including those described above with respect to scenario 100 and scenario 200 as well as those described below with respect to process 400. Autonomous police vehicle controller 300 may be installed in, equipped on, connected to or otherwise implemented in autonomous police vehicle 110 in scenario 100 and autonomous police vehicle 210 in scenario 200 to effect various embodiments in accordance with the present disclosure. Autonomous police vehicle controller 300 may include at least some of the components illustrated in FIG. 3.

Autonomous police vehicle controller 300 may include at least one sensor. For illustrative purpose, the at least one sensor is shown as one or more sensors 320(1)-320(N), with N being a positive integer greater than or equal to 1. The one or more sensors 320(1)-320(N) may include at least one camera, at least one laser gun, at least one light detection and ranging (LIDAR) sensor, at least one ultrasound sensor, at least one radar sensor, or any combination thereof. Each of the one or more sensors 320(1)-320(N) may be configured to detect a presence and/or movement of one or more vehicles and generate sensor data representative or indicative of a result of the detection. Each of the one or more sensors 320(1)-320(N) may be mounted on or otherwise coupled to a respective orientation mechanism. Each orientation mechanism may be configured to rotate, pivot, turn or otherwise change an angle or orientation of the respective sensor. That is, each orientation mechanism may include necessary mechanical, electrical, pneumatic and/or hydraulic components to effect the change in orientation of the respective sensor.

Autonomous police vehicle controller 300 may include a communication device 330. Communication device 330 may be configured to wirelessly transmit and receive data with one or more other vehicles and/or one or more components of one or more wireless communication networks. For instance, communication device 330 may be configured to wirelessly receive data directly from surveillance camera 140, roadside sensor 160 and/or vehicle 120. Alternatively or additionally, communication device 330 may be configured to wirelessly receive, from central computing system 195, data provided by surveillance camera 140, roadside sensor 160 and/or vehicle 120 via wireless communication infrastructure 170.

Autonomous police vehicle controller 300 may include a memory device 340 configured to store data, firmware and software programs therein. For example, memory device 340 may store a record 342 of drivers and/or vehicles within a geographical region (e.g., city, county or state). Alternatively or additionally, memory device 340 may include a traffic laws database 346 of traffic laws.

Autonomous police vehicle controller 300 may include a processor 310 communicatively coupled to receive data from and to control operations of the one or more sensors 320(1)-320(N) and to control operations of communication device 330. Processor 310 may be coupled to memory device 340 to access data stored therein and to execute any firmware and/or software programs stored therein. Processor 310 may obtain an indication of violation of one or more traffic laws by a first vehicle (e.g., vehicle 120). Processor 310 may also maneuver an autonomous police vehicle to pursue the first vehicle in response to obtaining the indication. Processor 310 may further remotely execute one or more actions with respect to the first vehicle. For instance, processor 310 may determine a violation of one or more traffic laws by the first vehicle based on sensor data received from the one or more sensors 320(1)-320(N) and/or data received via communication device 330 (e.g., from central computing system 195), and processor 310 may maneuver the autonomous vehicle, via vehicle control interface 360, to pursue the first vehicle in response to determining the violation of the one or more traffic laws.

In some embodiments, in obtaining the indication of the violation of the one or more traffic laws by the first vehicle, processor 310 may be configured to perform a number of operations. For example, processor 310 may controlling a sensor (e.g., a laser gun) of the one or more sensors 320(1)-320(N) to point the sensor in a predetermined direction (e.g., a direction that allows one or more traffic violations to be in a line of sight, or visible, to the one or more sensors 320(1)-320(N)). Processor 310 may receive data (e.g., a reading of the speed by the laser gun) from the sensor. Processor 310 may determine that a speed of the first vehicle exceeded a threshold speed based on the received data. Processor 310 may determine the threshold speed for a given section of road by searching traffic laws database 346 for a legal speed limit for that section of road or by querying a remote central computing system (e.g., central computing system 195). As another example, processor 310 may control a sensor (e.g., a camera) of the one or more sensors 320(1)-320(N) to point the sensor in the predetermined direction. Processor 310 may receive one or more images from the sensor and analyze the one or more images. Processor 310 may determine that at least one of the one or more traffic laws has been violated by the first vehicle responsive to a result of the analyzing.

Alternatively or additionally, in obtaining the indication of the violation of the one or more traffic laws by the first vehicle, processor 310 may wirelessly receive a signal from a remote device (e.g., surveillance camera 140) or a second vehicle (e.g., vehicle 130) indicating that at least one of the one or more traffic laws has been violated by the first vehicle. In some embodiments, processor 310 may wirelessly transmit, via communication device 330, a request to one or more government agencies to request for backup, medical assistance or any type of assistance.

In some embodiments, in maneuvering the autonomous police vehicle to pursue the first vehicle, processor 310 may be configured to track a location of the first vehicle and control operations related to at least a speed and a steering of the autonomous police vehicle based on a result of the tracking. For example, processor 310 may control the one or more sensors 320(1)-320(N) to follow the first vehicle to determine a movement and location of the first vehicle. As another example, processor 310 may wirelessly receive, via communication device 330, locational information about the first vehicle from the first vehicle, wireless communication service provider, a surveillance system, one or more satellites, one or more sources of such information, or any combination thereof.

In some embodiments, in remotely executing the one or more actions with respect to the first vehicle, processor 310 may be configured to perform a number of operations. For example, processor 310 may control a camera of the one or more sensors 320(1)-320(N) to point the camera toward a license plate of the first vehicle. Processor 310 may zoom the camera to obtain an enlarged view of the license plate. Processor 310 may trigger the camera to capture an image of the enlarged view of the license plate.

In some embodiments, in remotely executing the one or more actions with respect to the first vehicle, processor 310 may be configured to perform a number of other operations. For example, processor 310 may establish, via communication device 330, wireless communication with the first vehicle (e.g., using any protocol and/or technology suitable for vehicle-to-vehicle communication). Processor 310 may wirelessly transmit, via communication device 330, a first message to the first vehicle, with the first message indicating the violation of the one or more traffic laws by the first vehicle. Additionally or alternatively, processor 310 may also activate a siren of the autonomous police vehicle to sound the siren to signal the first vehicle to pull over.

In some embodiments, in remotely executing the one or more actions with respect to the first vehicle, processor 310 may be configured to perform additional operations. For example, processor 310 may wirelessly receive, via communication device 330, a response from the first vehicle, with the response indicating that the first vehicle was in an autonomous driving mode at a time of the violation of the one or more traffic laws. Processor 310 may determine a disposition (e.g., issuing a warning or a ticket) regarding the violation of the one or more traffic laws by the first vehicle which was in the autonomous driving mode. Processor 310 may wirelessly transmit, via communication device 330, a second message to the first vehicle, the second message indicating the disposition as a result of the determining (e.g., the second message may trigger the first vehicle to display and/or print a ticket or a warning, and the second message may indicate that the first vehicle is free to go).

As another example, processor 310 may wirelessly receive, via communication device 330, a response from the first vehicle, with the response including an image of a driver's license of a human driver of the first vehicle. Processor 310 may verify an authenticity of the driver's license (e.g., by checking the driver's data in record 342 or by checking a police database and/or any number of database(s) of one or more other government agencies). Responsive to a positive result of the verifying of the authenticity, processor 310 may determine a disposition (e.g., issuing a warning or a ticket) regarding the violation of the one or more traffic laws by the first vehicle which was in a manual driving mode. Processor 310 may wirelessly transmit, via communication device 330, a second message to the first vehicle, with the second message indicating the disposition as a result of the determining (e.g., the second message may trigger the first vehicle to display and/or print a ticket or a warning, and the second message may indicate that the first vehicle is free to go).

In some embodiments, processor 310 may be configured to execute a machine learning tool (e.g., a deep neural network) to learn of one or more locations at which the violation of the one or more traffic laws by one or more vehicles is visible. For example, the machine learning tool may be a software program stored in memory device 340 as part of one or more software programs 344 and, thus, processor 310 may execute the one or more software programs 344 for the learning. Processor 310 may also maneuver the autonomous police vehicle to park at one of the one or more locations. Additionally, processor 310 may be configured to receive update to update to record 342 and update to the one or more software programs 344 (e.g., wirelessly via communication device 330).

In some embodiments, autonomous police vehicle controller 300 may include an input/output (I/O) device 350 coupled to processor 310. As autonomous police vehicle controller 300 may be implemented in an autonomous police vehicle that is equipped or otherwise configured to carry one or more passengers or users (e.g., police officer(s)), I/O device 350 may be configured to receive user input from the one or more users and to display, present or otherwise provide information/data to the one or more users (e.g., visually, audibly or both visually and audibly). For example, I/O device 350 may include one or more of one or more touch-sensing panels, one or more keyboards, one or more radio dials, one or more microphones, and one or more speakers. Processor 310 may receive user input, via I/O device 350, from a user (e.g., police officer riding in the autonomous police vehicle) indicating that the user is taking over to manually control, operate or otherwise maneuver the autonomous police vehicle. In response, processor 310 may change from an autonomous driving mode to a manual driving mode, and relinquish control of the vehicle to the user.

In some embodiments, autonomous police vehicle controller 300 may include a vehicle control interface 360 coupled to processor 310 such that processor 310 may autonomously control, operate or otherwise maneuver the autonomous police vehicle (e.g., autonomous police vehicle 110 and/or autonomous police vehicle 210) without human input, control and/or intervention when processor 310 operates in the autonomous driving mode. Vehicle control interface 360 may communicate with necessary mechanical, electrical, pneumatic and/or hydraulic components of the autonomous police vehicle for the control and/or maneuvering of the autonomous police vehicle. Thus, upon receiving signals and/or commands from processor 310, vehicle control interface 360 may actuate, activate, control and/or operate one or more parts of the autonomous police vehicle (e.g., to drive and maneuver the autonomous police vehicle).

Figure 4:
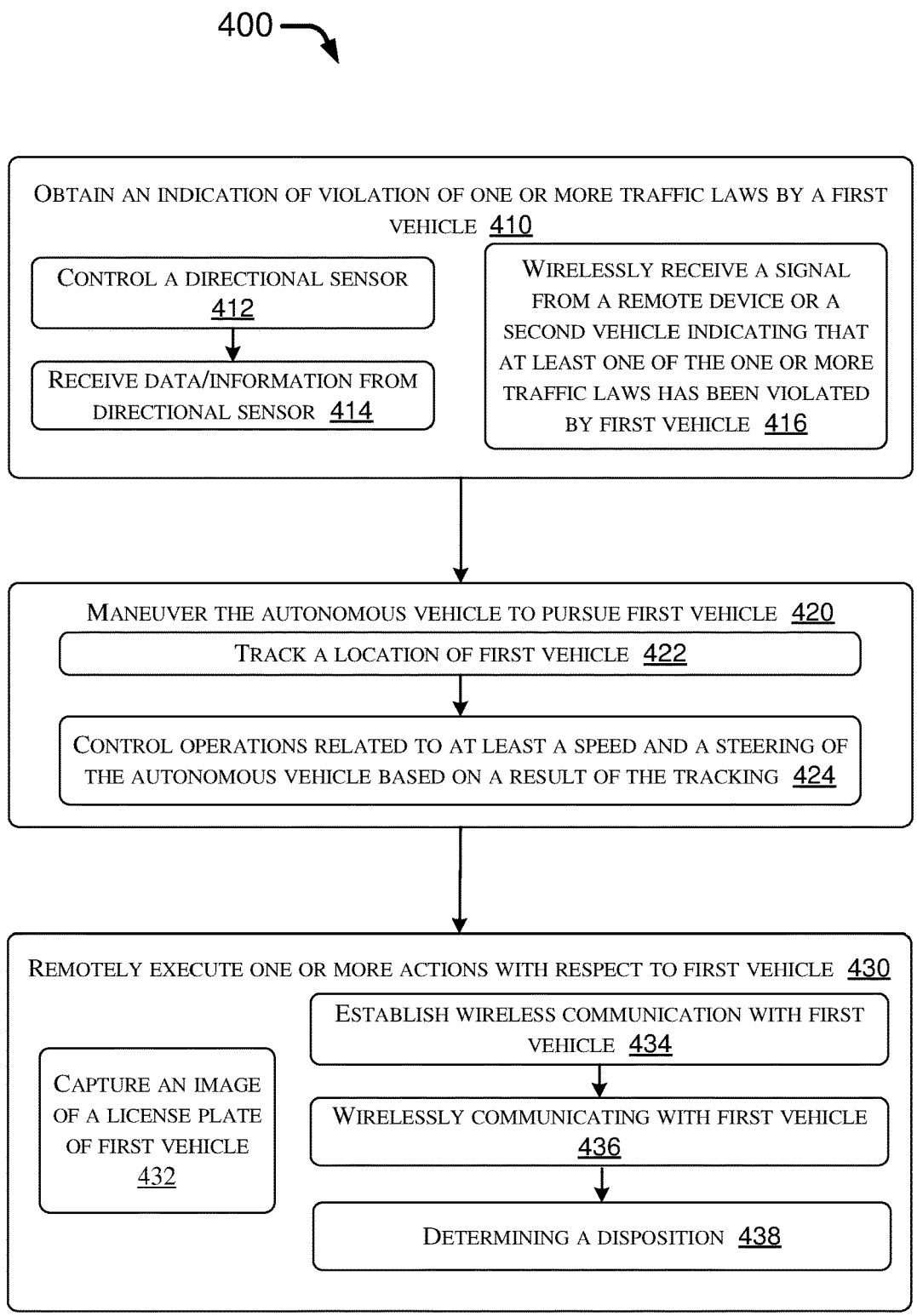
FIG. 4 is a flowchart depicting an example process in accordance with an embodiment of the present disclosure.

FIG. 4 illustrates an example process 400 in accordance with the present disclosure. Process 400 may include one or more operations, actions, or functions shown as blocks such as 410, 420 and 430 as well as sub-blocks 412, 414, 416, 422, 424, 432, 434, 436 and 438. Although illustrated as discrete blocks, various blocks of process 400 may be divided into additional blocks, combined into fewer blocks, or eliminated, depending on the desired implementation. Process 400 may be implemented in scenario 100 and scenario 200 and by autonomous police vehicle controller 300. For illustrative purposes and without limiting the scope of process 400, the following description of process 400 is provided in the context of autonomous police vehicle controller 300 in scenario 100. Process 400 may begin with block 410.

At 410, process 400 may involve processor 310 associated with autonomous police vehicle 110 obtaining an indication of violation of one or more traffic laws by vehicle 120. In obtaining the indication of violation of the one or more traffic laws by vehicle 120, process 400 may involve processor 310 performing a number of operations, as shown in sub-blocks 412, 414 and 416. At 412, process 400 may involve processor 310 controlling a sensor. Process 400 may proceed from 412 to 414. At 414, process 400 may involve processor 310 receiving data and/or information from the sensor. For example, processor 310 may control a sensor (e.g., a laser gun) to point the sensor in a predetermined direction, receive data from the sensor, and determine that a speed of vehicle 120 exceeded a threshold speed based on the received data. As another example, processor 310 may control a sensor (e.g., a camera) to point the sensor in a predetermined direction, receive one or more images from the sensor, analyze the one or more images, and determine that at least one of the one or more traffic laws (e.g., running a red light) has been violated by vehicle 120 responsive to a result of the analyzing. Alternatively, at 416, in obtaining the indication of the violation of the one or more traffic laws by vehicle 120, process 400 may involve processor 310 wirelessly receiving a signal from a remote device (e.g., a surveillance camera, a roadside camera or a speed sensor) or vehicle 130 indicating that at least one of the one or more traffic laws has been violated by vehicle 120. Process 400 may proceed from 410 to 420.

At 420, process 400 may involve processor 310 maneuvering autonomous police vehicle 110 to pursue vehicle 120 responsive to obtaining the indication. In maneuvering autonomous police vehicle 110 to pursue vehicle 120, process 400 may involve processor 310 performing a number of operations, as shown in sub-blocks 422 and 424. At 422, process 400 may involve processor 310 tracking a location of vehicle 120. Process 400 may proceed from 422 to 424. At 424, process 400 may involve processor 310 controlling operations related to at least a speed and a steering of autonomous police vehicle 110 based on a result of the tracking. Process 400 may proceed from 420 to 430.

At 430, process 400 may involve processor 310 remotely executing one or more actions with respect to vehicle 120. In remotely executing one or more actions with respect to vehicle 120, process 400 may involve processor 310 performing a number of operations, as shown in sub-blocks 432, 434, 436 and 438. At 432, process 400 may involve processor 310 capturing an image of a license plate of vehicle 120. For example, processor 310 may control a camera on autonomous police vehicle 110 to point the camera toward a license plate of vehicle 120, zoom the camera to obtain an enlarged view of the license plate, and trigger the camera to capture an image of the enlarged view of the license plate. At 434, in remotely executing the one or more actions with respect to vehicle 120, processor 310 may establish wireless communication with vehicle 120 (e.g., using any protocol and/or technology suitable for vehicle-to-vehicle communication). Process 400 may proceed from 434 to 436. At 436, processor 310 may wirelessly communicate with vehicle 120. Process 400 may proceed from 436 to 438. At 438, processor 310 may determine a disposition (e.g., issuing a warning or a ticket). For example, processor 310 may first establish wireless communication with vehicle 120 and then wirelessly transmit a first message to vehicle 120, with the first message indicating the violation of the one or more traffic laws by vehicle 120.

In an event that vehicle 120 was in an autonomous driving mode at a time of the violation of the one or more traffic laws, processor 310 may wirelessly receive a response from vehicle 120, the response indicating that vehicle 120 was in the autonomous driving mode at the time of the violation of the one or more traffic laws. Processor 310 may determine a disposition (e.g., issuing a warning or a ticket) regarding the violation of the one or more traffic laws by vehicle 120 which was in the autonomous driving mode. Processor 310 may also wirelessly transmit a second message to vehicle 120, with the second message indicating the disposition as a result of the determining (e.g., the second message may trigger the first vehicle to display and/or print a ticket or a warning, and the second message may indicate that the first vehicle is free to go).

In an event that vehicle 120 was in a manual driving mode at a time of the violation of the one or more traffic laws, processor 310 may wirelessly receive a response from vehicle 120, with the response including an image of a driver's license of a human driver of vehicle 120. Processor 310 may verify an authenticity of the driver's license (e.g., by checking a police database and/or any number of database(s) of one or more other government agencies). Responsive to a positive result of the verifying of the authenticity, processor 310 may determine a disposition (e.g., issuing a warning or a ticket) regarding the violation of the one or more traffic laws by vehicle 120 which was in the manual driving mode. Processor 310 may also wirelessly transmit a second message to vehicle 120, with the second message indicating the disposition as a result of the determining (e.g., the second message may trigger the first vehicle to display and/or print a ticket or a warning, and the second message may indicate that the first vehicle is free to go).

In some embodiments, process 400 may involve processor 310 performing one or more additional operations. For instance, process 400 may involve processor 310 executing a machine learning tool to learn about one or more locations at which the violation of the one or more traffic laws by one or more vehicles is visible. Process 400 may also involve processor 310 maneuvering autonomous police vehicle 110 to park at one of the one or more locations. In some embodiments, the machine learning tool may include a deep neural network.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
   obtaining, by a processor associated with an autonomous vehicle, information with respect to a first vehicle;
   maneuvering, by the processor, the autonomous vehicle to pursue the first vehicle responsive to the information indicating violation of one or more traffic laws by the first vehicle; and
   remotely executing, by the processor, one or more actions with respect to the first vehicle,
   wherein the violation of one or more traffic laws by the first vehicle comprises exceeding a speed limit for a section of road on which the first vehicle travels, failure to stop at a stop sign, failure to stop at a red traffic light, or a combination thereof.

2. The method of claim 1, wherein the obtaining of the information comprises:
   controlling a sensor to point the sensor in a predetermined direction;
   receiving data from the sensor; and
   determining that a speed of the first vehicle exceeded a threshold speed based on the received data.

3. The method of claim 1, wherein the obtaining of the information comprises:
   controlling a sensor to point the sensor in a predetermined direction;
   receiving one or more images from the sensor;
   analyzing the one or more images; and
   determining that at least one of the one or more traffic laws has been violated by the first vehicle responsive to a result of the analyzing.

4. The method of claim 1, wherein the obtaining of the information comprises wirelessly receiving a signal from a remote device or a second vehicle indicating that at least one of the one or more traffic laws has been violated by the first vehicle.

5. The method of claim 1, wherein the maneuvering of the autonomous vehicle to pursue the first vehicle comprises:
   tracking a location of the first vehicle; and
   controlling operations related to at least a speed and a steering of the autonomous vehicle based on a result of the tracking.

6. The method of claim 1, wherein the remotely executing of the one or more actions with respect to the first vehicle comprises:
   controlling a camera on the autonomous vehicle to point the camera toward a license plate of the first vehicle;
   zooming the camera to obtain an enlarged view of the license plate; and
   triggering the camera to capture an image of the enlarged view of the license plate.

7. The method of claim 1, wherein the remotely executing of the one or more actions with respect to the first vehicle comprises:
   establishing wireless communication with the first vehicle; and
   wirelessly transmitting a first message to the first vehicle, the first message indicating the violation of the one or more traffic laws by the first vehicle.

8. The method of claim 7, wherein the remotely executing of the one or more actions with respect to the first vehicle further comprises:
   wirelessly receiving a response from the first vehicle, the response indicating that the first vehicle was in an autonomous driving mode at a time of the violation of the one or more traffic laws;
   determining a disposition regarding the violation of the one or more traffic laws by the first vehicle which was in the autonomous driving mode; and
   wirelessly transmitting a second message to the first vehicle, the second message indicating the disposition as a result of the determining.

9. The method of claim 7, wherein the remotely executing of the one or more actions with respect to the first vehicle further comprises:
   wirelessly receiving a response from the first vehicle, the response including an image of a driver's license of a human driver of the first vehicle;
   verifying an authenticity of the driver's license;
   responsive to a positive result of the verifying of the authenticity, determining a disposition regarding the violation of the one or more traffic laws by the first vehicle which was in a manual driving mode; and
   wirelessly transmitting a second message to the first vehicle, the second message indicating the disposition as a result of the determining.

10. The method of claim 1, further comprising:
    executing a machine learning tool to learn about one or more locations at which the violation of the one or more traffic laws by one or more vehicles is visible; and
    maneuvering the autonomous vehicle to park at one of the one or more locations.

11. An apparatus implementable in an autonomous vehicle, comprising:
    at least one sensor; and
    a processor coupled to receive data from and to control operations of the at least one sensor, the processor configured to perform operations comprising:
      obtaining information with respect to a first vehicle from the at least one sensor;
      maneuvering the autonomous vehicle to pursue the first vehicle responsive to the information indicating violation of one or more traffic laws by the first vehicle; and
      remotely executing one or more actions with respect to the first vehicle,
    wherein the violation of one or more traffic laws by the first vehicle comprises exceeding a speed limit for a section of road on which the first vehicle travels, failure to stop at a stop sign, failure to stop at a red traffic light, or a combination thereof.

12. The apparatus of claim 11, wherein, in obtaining the information, the processor is configured to perform operations comprising:

controlling the at least one sensor to point the sensor in a predetermined direction;
receiving data from the at least one sensor; and
determining that a speed of the first vehicle exceeded a threshold speed based on the received data.

13. The apparatus of claim 11, wherein, in obtaining the information, the processor is configured to perform operations comprising:
controlling the at least one sensor to point the sensor in a predetermined direction;
receiving one or more images from the at least one sensor;
analyzing the one or more images; and
determining that at least one of the one or more traffic laws has been violated by the first vehicle responsive to a result of the analyzing.

14. The apparatus of claim 11, wherein, in maneuvering the autonomous vehicle to pursue the first vehicle, the processor is configured to perform operations comprising:
tracking a location of the first vehicle; and
controlling operations related to at least a speed and a steering of the autonomous vehicle based on a result of the tracking.

15. The apparatus of claim 11, wherein, in remotely executing the one or more actions with respect to the first vehicle, the processor is configured to perform operations comprising:
controlling a camera on the autonomous vehicle to point the camera toward a license plate of the first vehicle;
zooming the camera to obtain an enlarged view of the license plate; and
triggering the camera to capture an image of the enlarged view of the license plate.

16. The apparatus of claim 11, wherein, in remotely executing the one or more actions with respect to the first vehicle, the processor is configured to perform operations comprising:
establishing wireless communication with the first vehicle; and
wirelessly transmitting a first message to the first vehicle, the first message indicating the violation of the one or more traffic laws by the first vehicle.

17. The apparatus of claim 16, wherein, in remotely executing the one or more actions with respect to the first vehicle, the processor is configured to further perform operations comprising:
wirelessly receiving a response from the first vehicle, the response indicating that the first vehicle was in an autonomous driving mode at a time of the violation of the one or more traffic laws;
determining a disposition regarding the violation of the one or more traffic laws by the first vehicle which was in the autonomous driving mode; and
wirelessly transmitting a second message to the first vehicle, the second message indicating the disposition as a result of the determining.

18. The apparatus of claim 16, wherein, in remotely executing the one or more actions with respect to the first vehicle, the processor is configured to further perform operations comprising:
wirelessly receiving a response from the first vehicle, the response including an image of a driver's license of a human driver of the first vehicle;
verifying an authenticity of the driver's license;
responsive to a positive result of the verifying of the authenticity, determining a disposition regarding the violation of the one or more traffic laws by the first vehicle which was in a manual driving mode; and
wirelessly transmitting a second message to the first vehicle, the second message indicating the disposition as a result of the determining.

19. The apparatus of claim 11, wherein the processor is configured to further perform operations comprising:
executing a machine learning tool to learn about one or more locations at which the violation of the one or more traffic laws by one or more vehicles is visible; and
maneuvering the autonomous vehicle to park at one of the one or more locations.

20. An apparatus implementable in an autonomous vehicle, comprising:
at least one sensor configured to detect a movement of a first vehicle and provide sensor data indicative of a result of the detecting;
a communication device configured to wirelessly receive and transmit data;
a vehicle control interface configured to communicate with one or more components of the autonomous vehicle for maneuvering of the autonomous vehicle; and
a processor coupled to at least one sensor, the communication device and the vehicle control interface, the processor configured to perform operations comprising:
determining a violation of one or more traffic laws by the first vehicle based on sensor data received from the at least one sensor, data received from the communication device, or a combination thereof; and
maneuvering the autonomous vehicle, via the vehicle control interface, to pursue the first vehicle responsive to the determining of the violation,
wherein the violation of one or more traffic laws by the first vehicle comprises exceeding a speed limit for a section of road on which the first vehicle travels, failure to stop at a stop sign, failure to stop at a red traffic light, or a combination thereof.

* * * * *